US012793589B2

(12) United States Patent
Meng et al.

(10) Patent No.: US 12,793,589 B2
(45) Date of Patent: Nov. 10, 2026

(54) DISPLAY DEVICE, METHOD FOR CONTROLLING DISPLAY DEVICE, AND COMPUTER STORAGE MEDIUM

(71) Applicants: Hefei BOE Joint Technology Co., Ltd., Hefei (CN); BOE Technology Group Co., Ltd., Beijing (CN)

(72) Inventors: Song Meng, Beijing (CN); Jian Mao, Beijing (CN); Miao Liu, Beijing (CN)

(73) Assignees: HEFEI BOE JOINT TECHNOLOGY CO. , LTD., Hefei (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/993,594

(22) PCT Filed: May 24, 2024

(86) PCT No.: PCT/CN2024/095088

§ 371 (c)(1),
(2) Date: Jan. 13, 2025

(87) PCT Pub. No.: WO2025/001665

PCT Pub. Date: Jan. 2, 2025

(65) Prior Publication Data

US 2026/0031005 A1 Jan. 29, 2026

(30) Foreign Application Priority Data

Jun. 30, 2023 (CN) ......................... 202310812949.0

(51) Int. Cl.
*G09G 3/00* (2006.01)

(52) U.S. Cl.
CPC ..... *G09G 3/006* (2013.01); *G09G 2310/0275* (2013.01); *G09G 2310/08* (2013.01); *G09G 2330/12* (2013.01)

(58) Field of Classification Search
CPC ........... G09G 3/006; G09G 2310/0275; G09G 2310/08; G09G 2330/12; G09G 3/00; G09G 3/20
See application file for complete search history.

(56) References Cited

U.S. PATENT DOCUMENTS 7,610,175 B2 * 10/2009 Eidson ............... G01R 19/2509 377/19
10,163,399 B2 * 12/2018 Tan ....................... H02M 3/156
(Continued)

FOREIGN PATENT DOCUMENTS

CN 202601142 U 12/2012
CN 105185336 A 12/2015
(Continued)

*Primary Examiner* — Jose R Soto Lopez
(74) *Attorney, Agent, or Firm* — XSENSUS LLP

(57) ABSTRACT

Provided is a display device. A test circuit is provided in the display device, and the test circuit includes two first test lines extending in a first direction, the two ends of the first test line are disposed on the connection circuit board proximate to the first control assembly and proximate to the second control assembly, respectively, and the two first test lines are electrically connected to the second control assembly, so that the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board.

18 Claims, 12 Drawing Sheets

(56) References Cited

U.S. PATENT DOCUMENTS

| | | | | |
|---|---|---|---|---|
| 11,169,940 | B2 * | 11/2021 | Gupta | G06F 3/0653 |
| 2002/0008682 | A1 * | 1/2002 | Park | G09G 3/20<br>345/87 |
| 2002/0106822 | A1 * | 8/2002 | Kim | H05K 1/0268<br>438/18 |
| 2004/0122607 | A1 * | 6/2004 | Fishman | H04B 10/07<br>702/69 |
| 2005/0227517 | A1 * | 10/2005 | Chen | H04N 7/108<br>439/108 |
| 2005/0285832 | A1 * | 12/2005 | Shin | G09G 5/006<br>345/87 |
| 2006/0202937 | A1 * | 9/2006 | Chen | G09G 3/20<br>345/100 |
| 2006/0202938 | A1 * | 9/2006 | Chen | G09G 3/3685<br>345/100 |
| 2006/0202939 | A1 * | 9/2006 | Chen | G09G 3/3685<br>345/100 |
| 2006/0203138 | A1 * | 9/2006 | Chen | G09G 3/3688<br>349/39 |
| 2006/0284875 | A1 * | 12/2006 | Jeon | G06F 3/14<br>345/520 |
| 2007/0083905 | A1 * | 4/2007 | Lee | G09G 5/006<br>725/105 |
| 2007/0216611 | A1 * | 9/2007 | Chang | G09G 3/3208<br>345/76 |
| 2007/0285370 | A1 * | 12/2007 | Kim | G09G 3/20<br>345/87 |
| 2009/0279649 | A1 * | 11/2009 | Tsao | H04L 7/10<br>375/354 |
| 2010/0124270 | A1 * | 5/2010 | Yeh | H04N 7/108<br>375/E7.076 |
| 2010/0253654 | A1 * | 10/2010 | Weng | G09G 3/3688<br>345/204 |
| 2011/0199368 | A1 * | 8/2011 | Huang | G09G 3/20<br>345/213 |
| 2011/0199369 | A1 * | 8/2011 | Huang | G09G 3/20<br>345/213 |
| 2011/0277010 | A1 * | 11/2011 | Paul | H04N 7/104<br>725/149 |
| 2014/0119708 | A1 * | 5/2014 | Lee | H04N 21/44008<br>386/231 |
| 2014/0176412 | A1 * | 6/2014 | Oh | G09G 3/3611<br>345/99 |
| 2015/0187315 | A1 * | 7/2015 | Park | G09G 3/3685<br>345/99 |
| 2015/0255041 | A1 * | 9/2015 | Liu | G09G 5/18<br>345/213 |
| 2015/0379949 | A1 * | 12/2015 | Wang | G09G 3/3674<br>345/99 |
| 2016/0260367 | A1 | 9/2016 | Kwak et al. | |
| 2016/0313392 | A1 * | 10/2016 | Dong | G01R 31/2818 |
| 2017/0084236 | A1 * | 3/2017 | Wu | G09G 3/3614 |
| 2017/0085807 | A1 * | 3/2017 | Tsujioka | H04N 5/268 |
| 2018/0061362 | A1 * | 3/2018 | Kim | G09G 5/28 |
| 2018/0317889 | A1 * | 11/2018 | Carpenter | A61B 8/12 |
| 2019/0073972 | A1 * | 3/2019 | Gao | G09G 3/3648 |
| 2019/0181213 | A1 * | 6/2019 | Lim | G09G 3/3225 |
| 2020/0236777 | A1 * | 7/2020 | Chobanyan | G01R 31/2818 |
| 2020/0273407 | A1 * | 8/2020 | Hu | G09G 3/3688 |
| 2021/0247634 | A1 | 8/2021 | Chen et al. | |
| 2021/0287594 | A1 * | 9/2021 | Kim | G09G 3/2092 |
| 2021/0366330 | A1 * | 11/2021 | Huang | G09G 3/006 |
| 2023/0206821 | A1 * | 6/2023 | Gu | G09G 3/2096<br>345/213 |
| 2025/0299646 | A1 * | 9/2025 | Baek | G09G 3/20 |

FOREIGN PATENT DOCUMENTS

| | | | |
|---|---|---|---|
| CN | 105975691 | A | 9/2016 |
| CN | 109856499 | A | 6/2019 |
| CN | 110349542 | A | 10/2019 |
| CN | 110890044 | A | 3/2020 |
| CN | 110890045 | A | 3/2020 |
| CN | 114238199 | A | 3/2022 |
| CN | 116072025 | A | 5/2023 |

* cited by examiner

DISPLAY DEVICE, METHOD FOR CONTROLLING DISPLAY DEVICE, AND COMPUTER STORAGE MEDIUM

CROSS-REFERENCE TO RELATED APPLICATIONS

This application is a U.S. national stage of international application No. PCT/CN2024/095088, filed on May 24, 2024, which claims priority to Chinese Patent Application No. 202310812949.0, filed on Jun. 30, 2023, and entitled "DISPLAY DEVICE, DISPLAY DEVICE CONTROL METHOD, AND COMPUTER STORAGE MEDIUM", the contents of each are incorporated herein by reference in its entirety.

TECHNICAL FIELD

The present disclosure relates to the field of display technologies, and in particular to a display device, a method for controlling the display device, and a computer storage medium.

BACKGROUND

A display device is capable of realizing a display function. The display device includes a display panel, a source driver circuit, a connection circuit board, and a timing controller. The source driver circuit is connected to the display panel, and the connection circuit board is connected to the source driver circuit and the timing controller, respectively. The source driver circuit acquires a measurement signal from the display panel and transmits the measurement signal to the timing controller. The timing controller samples the measurement signal through a preset sampling clock and controls the display panel based on the measurement signal.

However, the lengths of the connection circuit boards in the display device are different in different application scenarios, which in turn requires the sampling clock of different phases to be written in the timing controller, resulting in poor applicability of the display device.

SUMMARY

Embodiments of the present disclosure provide a display device, a method for controlling the display device, and a computer storage medium. The described technical solutions are as follows.

According to some embodiments of the present disclosure, a display device is provided. The display device includes a display panel, a first control assembly, a connection circuit board, and a second control assembly;

- the display panel is connected to the first control assembly, one end of the connection circuit board is connected to the first control assembly, and another end of the connection circuit board is connected to the second control assembly;
- the connection circuit board includes a board body, a test circuit and a signal transmission line that are disposed on the board body, wherein the test circuit includes two first test lines extending in a first direction, first ends of the two first test lines are electrically connected and are disposed on a side of the connection circuit board proximate to the first control assembly, second ends of the two first test lines are disposed on a side of the connection circuit board proximate to the second control assembly and are connected to the second control assembly, the first direction being parallel to the signal transmission line; and the signal transmission line is configured to transmit signals between the first control assembly and the second control assembly; and
- the second control assembly is configured to: transmit a test signal to a second end of one first test line in the two first test lines and receive the test signal from a second end of another first test line in the two first test lines, determine a length of the connection circuit board in the first direction based on a transmitting moment and a receiving moment of the test signal, and determine a phase of a sampling clock based on the length of the connection circuit board in the first direction.

In some embodiments, the test circuit further includes an even number of second test lines extending in the first direction, wherein first ends of the second test lines are disposed on the side of the connection circuit board proximate to the first control assembly, and second ends of the second test lines are disposed on the side of the connection circuit board proximate to the second control assembly, the even number of second test lines being connected in series, and further being connected in series with the first ends of the two first test lines.

In some embodiments, the board body includes multiple strip bodies, a length direction of each of the strip bodies being parallel to the first direction.

In some embodiments, test lines in the test circuit are disposed on at least two of multiple strip bodies, the test lines in the test circuit including the first test lines and the second test lines.

In some embodiments, the first test lines and the second test lines are disposed on a first strip body in multiple strip bodies.

In some embodiments, the display device further includes first connection structures disposed in the first control assembly and in the second control assembly, wherein the first connection structures are connected to the even number of second test lines and further connect the even number of second test lines in series with the first ends of the two first test lines.

In some embodiments, the connection circuit board further includes second connection structures disposed on the board body, the second connection structure being connected to the even number of second test lines and connecting the even number of second test lines in series with the first ends of the two first test lines.

In some embodiments, the display device further includes third connection structures and fourth connection structures, wherein the third connection structures are disposed on the connection circuit board, and the fourth connection structures are disposed in the first control assembly or the second control assembly;

in a case that the fourth connection structures are disposed in the first control assembly, the third connection structures are connected to the second ends of the even number of second test lines, and the fourth connection structures are connected to the first ends of the even number of second test lines and connect the even number of second test lines in series with the first ends of the two first test lines;

- in a case that the fourth connection structures are disposed in the second control assembly, the fourth connection structures are connected to the second ends of the even number of second test lines, and the third connection structures are connected to the first ends of the even number of second test lines and connect the even number of second test lines in series with the first ends of the two first test lines.

In some embodiments, the first control assembly includes a first circuit board, a fifth connection structure, and multiple first controllers, the fifth connection structure being disposed on the first circuit board and multiple first controllers being electrically connected to the first circuit board; wherein the fifth connection structure is connected to the first ends of the two first test lines.

In some embodiments, the second control assembly includes a second circuit board, and connection lines and a second controller disposed on the second circuit board, the second controller being electrically connected to the second ends of the two first test lines via the connection lines; wherein the connection lines are further connected to the first ends of the two first test lines.

In some embodiments, the second circuit board is provided with an edge region connected to the connection circuit board, the second controller being disposed in the edge region.

In some embodiments, the first control assembly is a source driver control assembly and the second control assembly is a timing control assembly.

In some embodiments, the connection circuit board includes a flexible circuit board.

According to some embodiments of the present disclosure, a method for controlling a display device is provided. The method is applicable to the second control assembly in the display device as defined in anyone of the above embodiments. The method includes:

transmitting the test signal to the second end of one first test line in the two first test lines in the display device;

receiving the test signal from the second end of another first test line in the two first test lines;

determining the length of the connection circuit board in the first direction based on the transmitting moment and the receiving moment of the test signal; and determining the phase of the sampling clock based on the length of the connection circuit board in the first direction.

In some embodiments, determining the length of the connection circuit board in the first direction based on the transmitting moment and the receiving moment of the test signal includes:

determining a transmission duration of the test signal in the test circuit based on the transmitting moment and the receiving moment of the test signal; and determining the length of the connection circuit board in the first direction based on the transmission duration and a transmission speed of the test signal in the test circuit.

In some embodiments, determining the length of the connection circuit board in the first direction based on the transmission duration and the transmission speed of the test signal in the test circuit includes:

acquiring a duration difference between the transmission duration and a reference duration;

determining a length difference based on the duration difference and a transmission speed of the test signal in the test circuit; and determining the length of the connection circuit board in the first direction based on the length difference and a reference length;

wherein the reference duration is a transmission duration of the test signal in a reference connection circuit board of the reference length.

In some embodiments, determining the length of the connection circuit board in the first direction based on the transmitting moment and the receiving moment of the test signal includes:

determining a transmission duration of the test signal in the test circuit based on the transmitting moment and the receiving moment of the test signal;

searching for whether a reference length corresponding to the transmission duration is present in a preset lookup table based on the transmission duration, wherein the preset lookup table records multiple reference transmission durations and reference lengths, corresponding to multiple reference transmission lengths, of the connection circuit board;

in response to that the reference length corresponding to the transmission duration is present in the preset lookup table, determining the reference length as the length of the connection circuit board in the first direction.

In some embodiments, receiving the test signal from the second end of another first test line in the two first test lines includes:

acquiring the test signal by sampling the second end of another first test line in the two first test lines by a sampling clock of a preset frequency.

According to some embodiments of the present disclosure, a display device is provided. The display device includes a processor and a memory storing at least one instruction, at least one program segment, a code set, or an instruction set therein, wherein the processor, when loading and executing the at least one instruction, the at least one program segment, the code set, or the instruction set, is caused to perform the method for controlling the display device as described above.

According to some embodiments of the present disclosure, a non-transitory computer storage medium is provided. The non-transitory computer storage medium stores at least one instruction, at least one program segment, a code set, or an instruction set therein, wherein the at least one instruction, the at least one program segment, the code set, or the instruction set, when loaded and executed by a processor, causes the process to perform the method for controlling the display device as described above.

According to some embodiments of the present disclosure, a computer program product or computer program is provided. The computer program product or computer program includes computer instructions that are stored in a computer-readable storage medium. The computer instructions, when read and executed by a processor of a computer device, cause the computer device to perform the display control method as described above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

The foregoing drawings illustrate certain embodiments of the application and are hereinafter described in greater detail. The drawings and written description are not intended to limit the scope of the present disclosure in any manner, but rather to illustrate the inventive concepts to those skilled in the art by reference to specific embodiments.

DETAILED DESCRIPTION

To make the objective, technical solutions, and advantages of the present disclosure clearer, embodiments of the present disclosure will be further described in detail with reference to the accompanying drawings.

Figure 1:
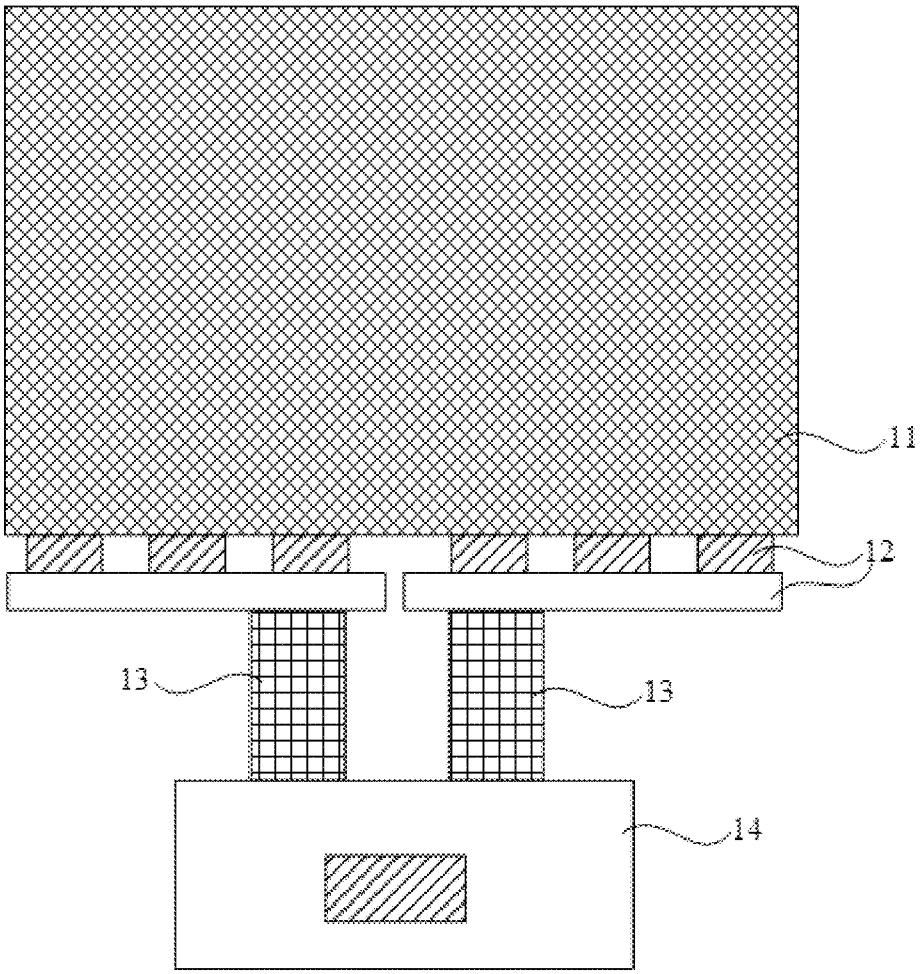
FIG. 1 is a schematic structural diagram of a display device.

A display device is capable of realizing a display function. FIG. 1 is a schematic structural diagram of a display device, as shown in FIG. 1, the display device includes a display panel 11, a source driver control assembly 12, a connection circuit board 13, and a timing control assembly 14.

The display panel 11 is connected to the source driver control assembly 12, one end of the connection circuit board 13 is connected to the source driver control assembly 12, and the other end of the connection circuit board 13 is connected to the timing control assembly 14.

The source driver control assembly 12 includes a circuit board and multiple source driver integrated circuits (ICs) disposed on the circuit board. Multiple source driver ICs acquire detection signals from the display panel 11 and transmit the detection signals to the connection circuit board 13; the connection circuit board 13 transmits the detection signals to the timing control assembly 14; the timing control assembly 14 determines a control signal based on the detection signals, and control the display panel 11 by the control signal, thereby enhancing the display effect of the display panel 11.

The timing control assembly 14, after acquiring the detection signal, needs to use a sampling clock of the corresponding phase for sampling based on the frequency of the detection signal. But in different application scenarios, the source driver control assembly 12 and the timing control assembly 14 may be connected by connection circuit boards 13 of different lengths, and the lengths of the traces in the connection circuit boards 13 of different lengths may be different, resulting in the timing control assembly 14 to receive the detection signal with different time delays.

Figure 2:
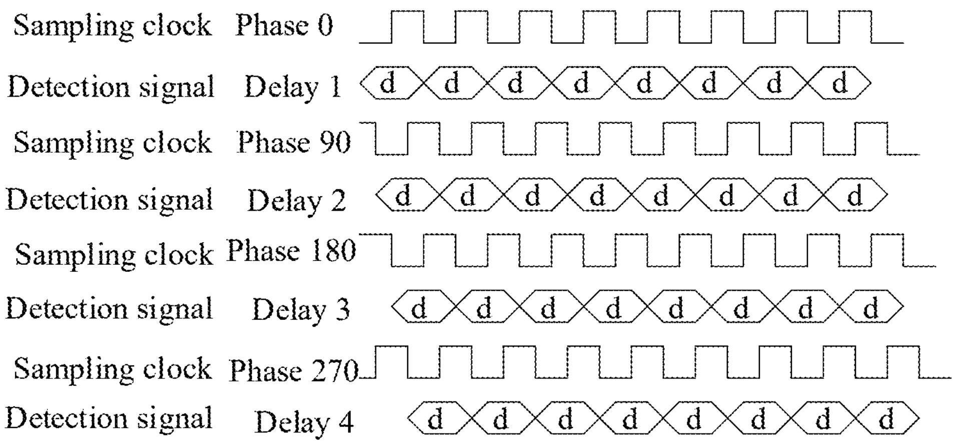
FIG. 2 is a schematic diagram of the correspondence between sampling clocks and detection signals in some embodiments of the present disclosure.

Exemplarily, FIG. 2 is a schematic diagram of the correspondence between sampling clocks and detection signals in some embodiments of the present disclosure. As shown in FIG. 2, for different time delays, the timing control assembly needs to sample the detection signal by the sampling clock of different phases. The d in the detection signal is data contained in the detection signal.

The current approach includes: a corresponding program is written in the timing control assembly based on different time delays, the program recording the phase of the sampling clock corresponding to the time delay; and when the display device is running, the timing control assembly samples the detection signal by the phase of the sampling clock in the pre-written program.

However, the above method is cumbersome, a corresponding program needs to be re-written in the timing control assembly in different application scenarios, which seriously increases the difficulty of the secondary development of the display device, resulting in a lower applicability of the display panel.

Embodiments of the present disclosure provide a display device, a method for controlling the display device, and a computer storage medium, which solves some problems in the above related art.

Figure 3:
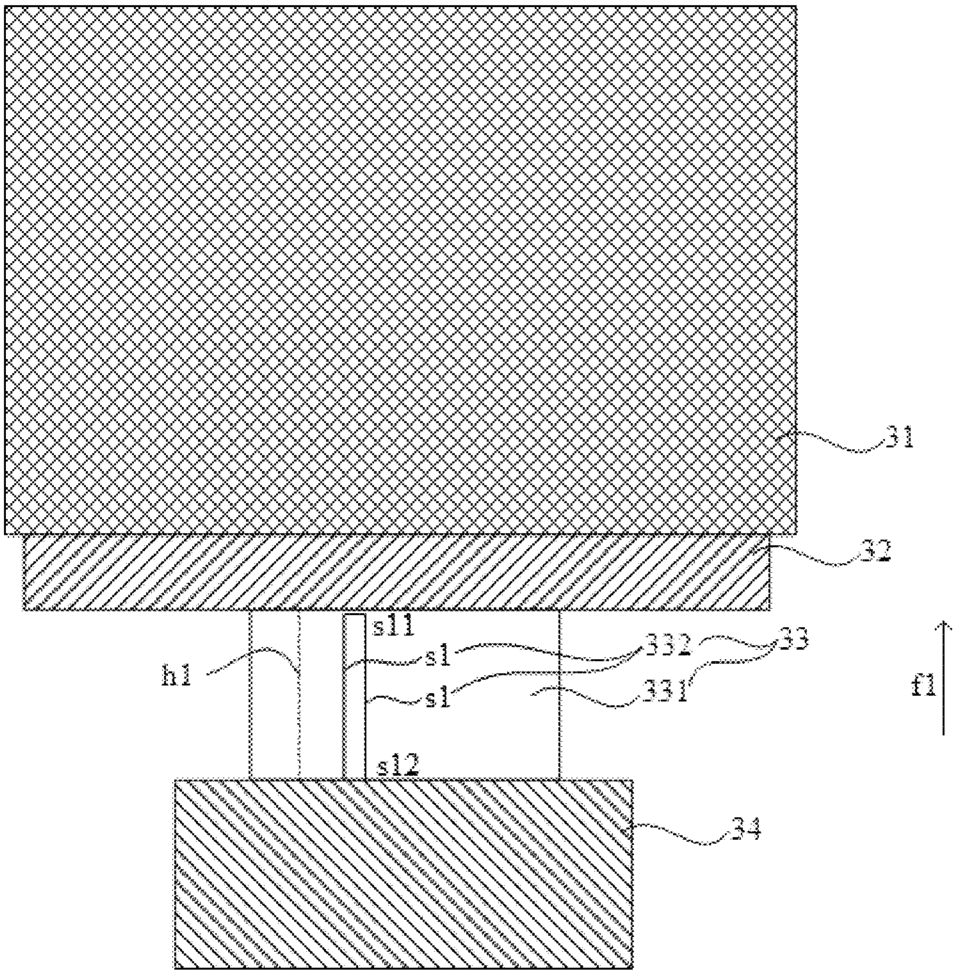
FIG. 3 is a schematic structural diagram of a display device according to some embodiments of the present disclosure.

FIG. 3 is a schematic structural diagram of a display device according to some embodiments of the present disclosure, the display device includes a display panel 31, a first control assembly 32, a connection circuit board 33, and a second control assembly 34.

The display panel 31 is connected to the first control assembly 32, one end of the connection circuit board 33 is connected to the first control assembly 32, and the other end of the connection circuit board 33 is connected to the second control assembly 34. That is, the two ends of the connection circuit board 33 are connected to the first control assembly 32 and the second control assembly 34, respectively.

The connection circuit board 33 includes a board body 331, a test circuit 332 and a signal transmission line h1 that are disposed on the board body 331. The test circuit 332 includes two first test lines s1 extending in a first direction f1, first ends s11 of the two first test lines s1 are electrically connected and are disposed on a side of the connection circuit board 33 proximate to the first control assembly 32, second ends s12 of the two first test lines s1 are disposed on a side of the second control assembly 34 proximate to the second control assembly 34 and are electrically connected to the second control assembly 34. The first direction f1 is parallel to the signal transmission line h1, and the signal transmission line h1 is configured to transmit signals between the first control assembly 32 and the second control assembly 34. For example, the signal transmission line h1 is configured to transmit various signals such as return signals, display control signals, and display data signals.

The second control assembly 34 is configured to: transmit a test signal to the second end s12 of one first test line in the two first test lines s1 and receive the test signal from the second end s12 of the other first test line in the two first test lines s1, determine a length of the connection circuit board 33 in the first direction f1 based on a transmitting moment and a receiving moment of the test signal, and determine a phase of a sampling clock based on the length of the connection circuit board 33 in the first direction f1.

The first test lines s1 extend in the first direction f1, and the first direction f1 is parallel to the signal transmission line h1, and the length of the signal transmission line h1 may be equivalent to the length of the connection circuit board 33 in the first direction f1, whereby the first test lines s1 may then reflect the length of the connection circuit board 33 in the first direction f1.

It should be noted that the second control assembly 34 determines the phase of the sampling clock based on the length of the connection circuit board 33 in the first direction f1 in a variety of ways. For example, it may pre-test to acquire the phase of the sampling clock corresponding to the connection circuit board 33 of various lengths to achieve the required sampling effect, and select the phase of the sampling clock based on the length of the connection circuit board 33. Alternatively, a time delay for signal transmission may be calculated based on the length of the connection circuit board 33 and the transmission speed of the signal in the connection circuit board 33, and the phase of the sampling clock may be determined based on the time delay.

In summary, according to the display device provided by the embodiments of the present disclosure, a test circuit is provided in the display device, and the test circuit includes two first test lines extending in a first direction, the two ends of the first test line are disposed on the connection circuit board proximate to the first control assembly and proximate to the second control assembly, respectively, and the two first test lines are electrically connected to the second control assembly, so that the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board. In this way, the display device is suitable for the connection circuit boards of various lengths, which solves the problem of the poor applicability of the display device in the related art, thereby improving the applicability of the display device.

Figure 4:
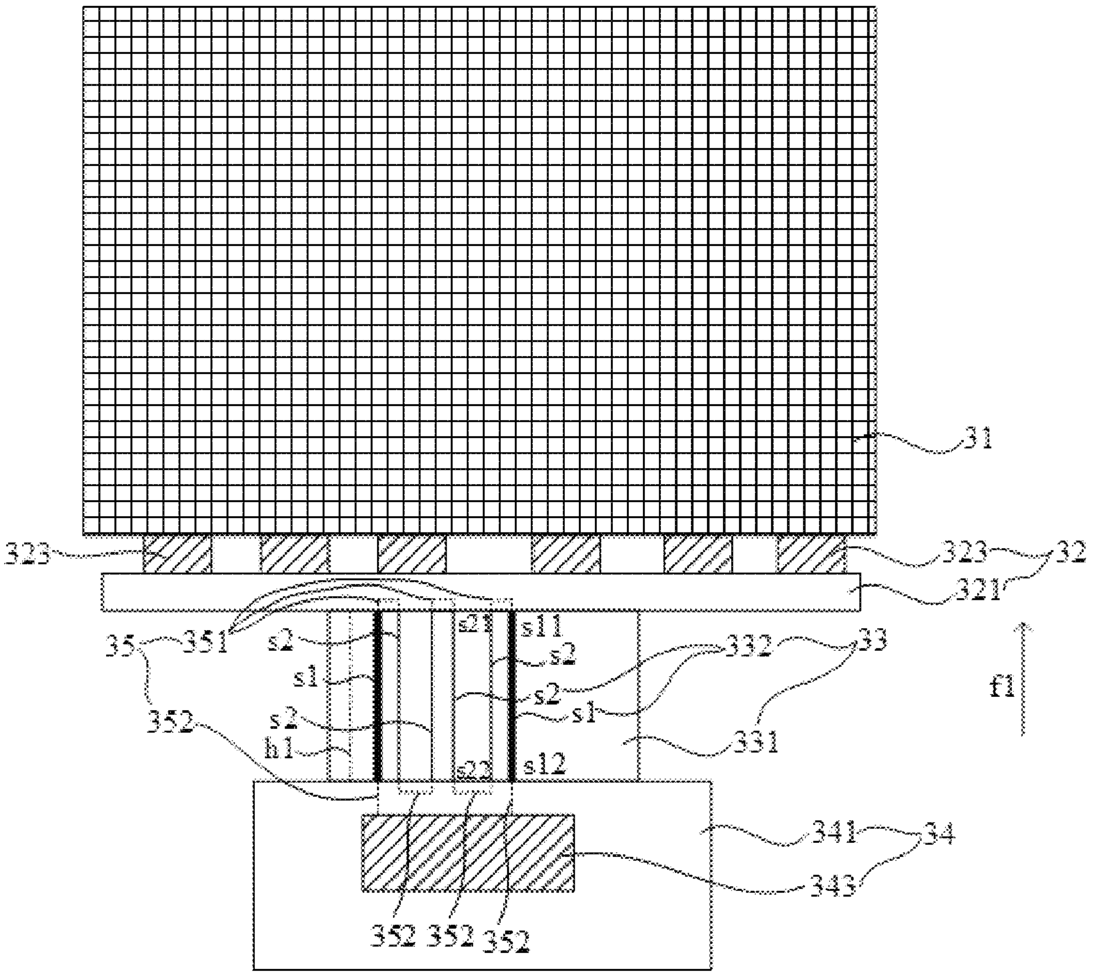
FIG. 4 is a schematic structural diagram of another display device according to some embodiments of the present disclosure.

FIG. 4 is a schematic structural diagram of another display device according to some embodiments of the present disclosure. The display device is made some adjustments based on the display device shown in FIG. 3.

The test circuit 332 further includes an even number of second test lines s2 extending in the first direction f1 (four second test lines s2 are illustrated in FIG. 4, but is not limited thereto), a first end s21 of each second test line s2 is disposed on a side of the connection circuit board 33 proximate to the first control assembly 32, a second end s22 of each second test line s2 is disposed on a side of the connection circuit board 33 proximate to the second control assembly 34, the even number of second test lines s2 are connected in series and are further connected in series with the first ends s11 of the two first test lines s1. That is, the even number of second test lines s2 are connected in series as a line, and the line formed in series is connected in series with the first ends s11 of the two first test lines s1.

Series connection is a basic way of connecting circuit elements. In this way, various circuit elements are connected one after another in sequence, end-to-end. In some embodiments of the present disclosure, the even number of second test lines s2 are connected into an s-shaped line, and one end of the s-shaped line is electrically connected to the first end s11 of one first test line s1, and the other end is electrically connected to the first end s11 of another first test line s1, such that the even number of second test lines s2 are connected in series with the first ends s11 of two first test lines s1.

In this way, the length of the test circuit 332 is enlarged to extend the transmission duration that the test signal is transmitted on the test circuit 332, which in turn reduces the difficulty of receiving the test signal by the second control assembly 34.

Further, for the scheme of directly connecting the first ends s11 of the two first test lines s1, the length of the loop formed by the test circuit 332 and the second control assembly 34 is about the sum of the lengths of the two first test lines s1. Exemplarily, if the length of the first test line is 20 centimeters, then the length of the loop formed by the test circuit 332 and the second control assembly 34 is 40 centimeters, and the transmission duration may be obtained by a preset formula, which may include:

$$v = \frac{c}{\sqrt{Er}};$$

$$\text{and } t = \frac{L}{v}.$$

Where v is the transmission speed of the test signal (electrical signal) in the first test line, c is the propagation speed of light in a vacuum, which can be 30 cm/nanosecond, Er is the dielectric constant of the first test line s1 on the connection circuit board 33, which can be 4, L is the length of the loop formed by the test circuit 332 and the second control assembly 34, which is 40 cm, and t is the transmission duration. The calculated v is about 15 cm/nanosecond, and t is about 2.67 nanoseconds. That is, to ensure accurate measurement, at least two samples must be taken for 1 nanometer, i.e., the frequency of the sampling clock is 2 gigahertz (GHz), which requires a high processing speed (the frequency of the sampling clock for the test signal) of the second control assembly 34, which enhances the manufacturing difficulty and the manufacturing cost of the display device. In the embodiment shown in FIG. 4, by arranging a number of S-shaped lines on the connection circuit board, and winding several back and forth on the connection circuit board, the length of the loop formed by the test circuit 332 and the second control assembly 34 is increased, and then the transmission duration of the test signal in the loop is extended. Exemplarily, if the number of the second test lines s2 is 8, the 8 second test lines s2 and the two first test lines s1 can form a loop including 5 round trips, compared to the above-described scheme of directly connecting the first ends s11 of the two first test lines s1, the length of the loop formed by the test lines 332 and the second control assembly 34 increases by 5 times, and consequently, the transmission duration also increases by 5 times, and the requirement for the frequency of the sampling clock of the second control assembly 34 is also reduced to 1/5 of the original, i.e., 400 megahertz, which is suitable for the field programmable gate array (FPGA) and for the application specific integrated circuit (ASIC), thereby reducing the requirement for processing speed of the second control assembly 34 and reducing the manufacturing difficulty and manufacturing cost of the display device.

The connection circuit board 33 is used to connect the first control assembly 32 to the second control assembly 34, the connection circuit board 33 is provided with multiple lines which may be used to transmit various signals between the first control assembly 32 and the second control assembly 34, and these signals may include signals used for realizing the display function of the display device. In addition, the connection circuit board 33 is connected to the first control assembly 32 and the second control assembly 34 via a connector, and the connector has a limited number of connection terminals (or pins). In addition to the connection terminals occupied by the lines on the connection circuit board used for realizing the display function, the connection terminals remaining on the connector may be redundant connection terminals, and the number of the second test lines s2 may be determined based on the number of redundant connection terminals on the connection board 33. Exemplarily, the number of the second test lines s2 are positively correlated with the number of the redundant connection terminals, i.e., the more the number of redundant connection terminals, the more the number of the second test lines s2. Alternatively, the number of second test lines s2 are determined based on some other factors, for example, the number of second test lines s2 may be negatively correlated with the length of the connection circuit board 33 in the first direction, i.e., the longer the length of the connection circuit board 33 in the first direction, the fewer the number of second test lines s2 may be.

It should be noted that the electrical connection of the two structures involved in the embodiments of the present disclosure may include a direct electrical connection between the two structures, or an indirect electrical connection between the two structures by some other electrical devices such as wires, switches, resistors, diodes, or circuit boards.

In some embodiments, the first control assembly 32 is a source driver control assembly, the source driver control assembly includes a source driver integrated circuit (Source IC), and the source driver integrated circuit is used to control the source trace in the display panel. The second control assembly 34 is a timing control assembly (TCON).

In addition, the electrical connection of the first test lines s1, the second test lines s2, and the second control assembly 34 involved in the above embodiments can be realized in various ways.

In some embodiments, the display device further includes first connection structures 35 disposed in the first control assembly 32 and in the second control assembly 34. The first connection structures 35 are connected to the even number of second test lines s2 and further connect the even number of second test lines s2 in series with the first ends s11 of the two first test lines s1.

Such a structure realizes the electrical connection of the first test lines s1, the second test lines s2, and the second control assembly 34 by providing the first connection structures 35 in the first control assembly 32 and the second control assembly 34. The first connection structures 35 may include conductive lines, conductive structures, or the like disposed in the first control assembly 32 and the second control assembly 34.

In some embodiments, the first control assembly 32 includes a first circuit board 321 and multiple first controllers 323, multiple first controllers 323 being electrically connected to the first circuit board 321. The first circuit board 321 is a printed circuit board, such as lateral printed circuit board (xpcb), and the first controllers 323 are driver integrated circuits. In addition, multiple first controllers 323 are also electrically connected to the display panel 31 for controlling the display panel 31.

The second control assembly 34 includes a second circuit board 341 and a second controller 343 disposed on the second circuit board 341. The second controller 343 may include an FPGA or an ASIC.

The first connection structures 35 include first portions 351 disposed on the first circuit board 321 and second portions 352 disposed on the second circuit board 341, the first portions 351 and the second portions 352 connect the even number of the second test lines s2 into a single line, and further connect the second test lines s2 connected into the single line in series with the two first test lines s1, and furthermore the second portions 352 disposed on the second circuit board 341 connect the two first test lines s1 with the second controller 343.

In the display device shown in FIG. 4, the first connection structures 35 are connected to the even number of second test lines s2, so that these even number of second test lines s2 are connected as a line (a line in the shape of an s), and these even number of second test lines s2 are connected in series with the first ends s11 of the two first test lines s1. In this structure, the first test lines s1 and the second test lines s2 are connected on the second circuit board 341 of the second control assembly 34 and the first circuit board 321 of the first control assembly 32, which does not require changes to the connection circuit board 33, thereby enhancing the applicability of the display panel provided by the embodiments of the present disclosure.

Optionally, the connection circuit board 33 includes a flexible circuit board (FPC). Alternatively, the connection circuit board 33 is a flexible flat cable (FFC).

It should be noted that the connection circuit board 33 includes a flexible circuit board, and the length of the connection circuit board 33 in the first direction f1 may refer to the length of the connection circuit board 33 in the first direction f1 when the connection circuit board 33 is in a flat state.

In order to clearly illustrate the various lines, and thus the various lines in FIG. 4 are represented by different thicknesses, dashed, or solid lines, which is not limited by the present disclosure.

Figure 5:
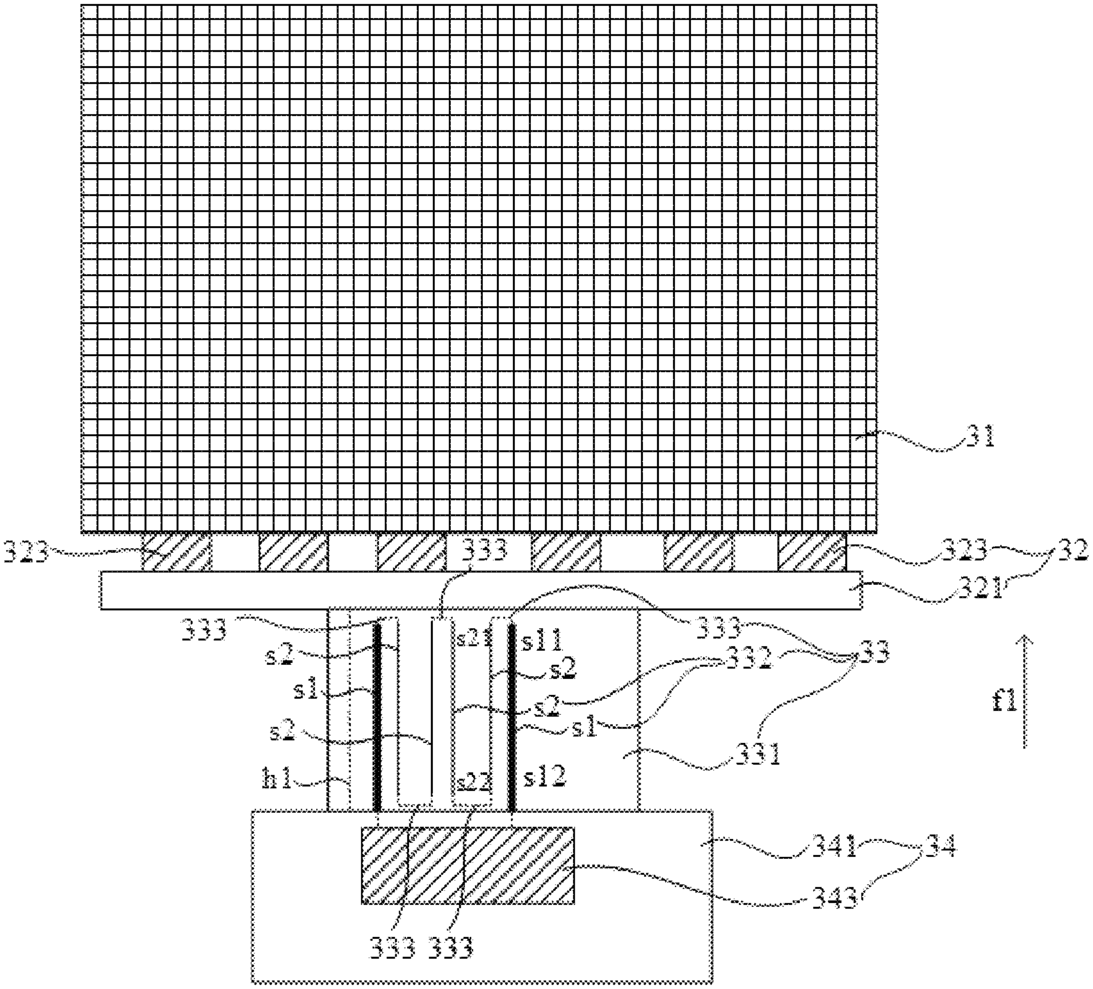
FIG. 5 is a schematic structural diagram of another display device according to some embodiments of the present disclosure.

In the display device provided by the embodiments of the present disclosure, the connection of the first test lines and the second test lines may also be realized by some other means. Exemplarily, as shown in FIG. 5, FIG. 5 is a schematic structural diagram of another display device according to some embodiments of the present disclosure, the connection circuit board 33 includes second connection structures 333 disposed on the board body 331, the second connection structures 333 are connected to the even number of the second test lines s2 and further connects the even number of the second test lines in series with the first ends s11 of the two first test lines s1. That is, the second connection structures 333 connect the even number of second test lines s2 connected in a line in series with the first ends s11 of the two first test lines s1.

In the scheme illustrated in FIG. 5, it is a connection between the first test lines and the second test lines by the lines on the circuit board 33.

Alternatively, a connection between the first test lines and the second test lines can be realized by one of the first control assembly 32 and the second control assembly 34 cooperated with the connection circuit board 33.

Figure 6:
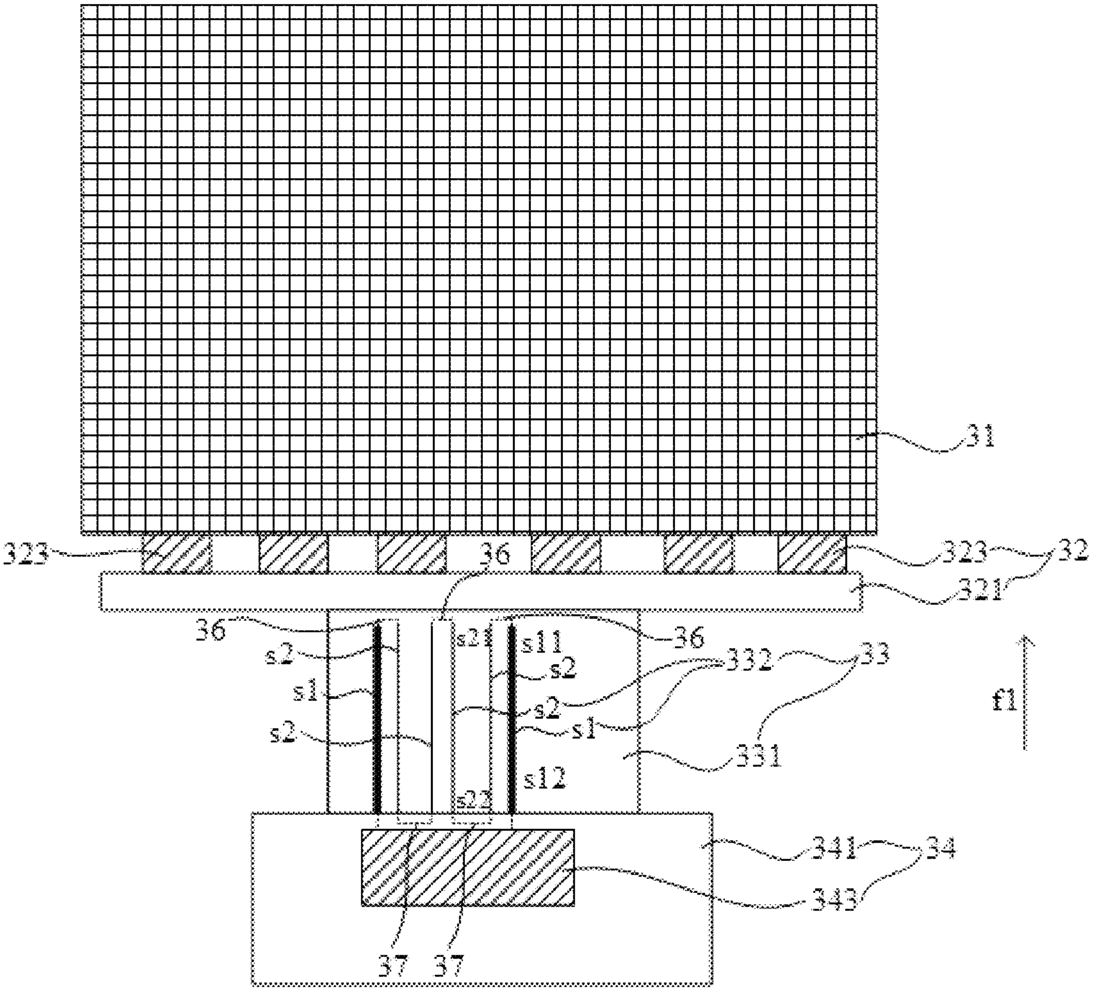
FIG. 6 is a schematic structural diagram of another display device according to some embodiments of the present disclosure.

Exemplarily, as shown in FIG. 6, FIG. 6 is a schematic structural diagram of another display device according to some embodiments of the present disclosure, the display device further includes third connection structures 36 and fourth connection structures 37, the third connection structures 36 are disposed on the connection circuit board 33, and the fourth connection structures 37 are disposed in either the first control assembly 32 or the second control assembly 34 (FIG. 6 shows a case in which the fourth connection structures 37 are disposed in the second control assembly 34, but is not limited thereto).

In the case that the fourth connection structures 37 are disposed in the second control assembly 34, the fourth connection structure 37 are connected to the second ends s22 of the even number of second test lines s2, the third connection structures 36 are connected to the first ends s21 of the even number of second test lines s2, and further connect the even number of second test line s2 in series with the first ends s11 of the two first test lines s1.

In the case that the fourth connection structures are disposed in the first control assembly 37, the third connection structure is connected to the second ends of the even number of second test lines, the fourth connection structure is connected to the first ends of the even number of second test lines, and further connects the even number of second test line in series with the first ends of the two first test lines.

Figure 7:
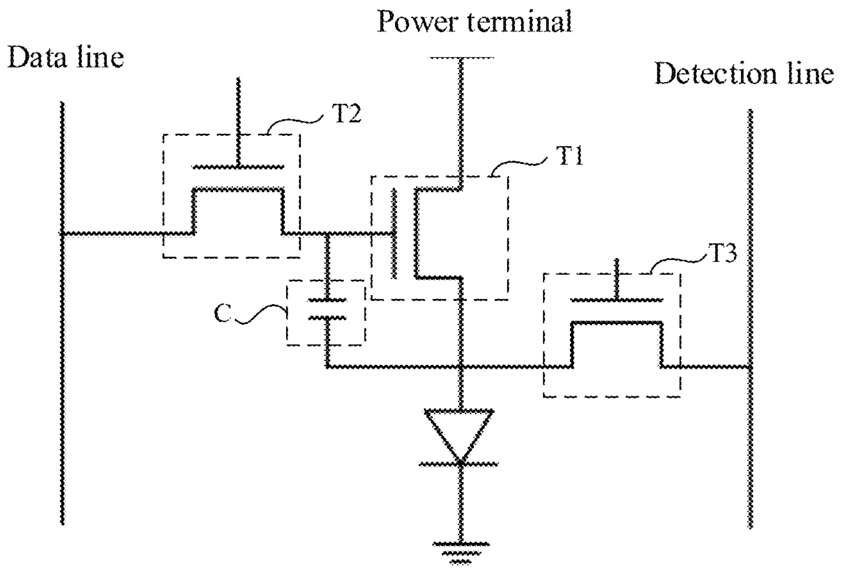
FIG. 7 is a schematic structural diagram of a circuit in a display device according to some embodiments of the present disclosure.

In the display device provided in embodiments of the present disclosure, the first control assembly is used to obtain some data from the display panel. In some embodiments, refer to FIG. 7, which is a schematic structural diagram of a circuit in the display device provided in the present disclosure, the circuit is a pixel circuit of 3T1C, including three thin film transistor (TFT) T1, T2, and T3, and a capacitor C. T2 is a driving TFT, T1 and T3 are switching TFTs, and T3 is connected to a sense line that acquires a detection signal in a sub-pixel and transmits the detection signal to the source driver integrated circuit. Since the detection signal transmitted to the source driver integrated circuit is a voltage analog signal, the analog-to-digital converter in the source driver integrated circuit converts the voltage analog signal into a digital signal and transmits the digital signal to the timing control assembly through the format of a low-voltage differential signal (LVDS). The timing control assembly calculates the compensation data based on the detection signal in the format of the LVDS and compensates each sub-pixel to improve the display effect. In the display device, the pixel circuit may be of other structures, which is not limited by the embodiments of the present disclosure.

It should be noted that the display panel includes multiple thin-film transistors to drive the display panel for display, but the multiple thin film transistors may be inconsistent in the manufacturing process, which makes the electrical signal on different thin film transistors different, resulting in uneven display. The problem is particularly serious in the active-matrix organic light-emitting diode (AMOLED) display panel, and the sub-pixels need to be compensated to improve the uniformity of different sub-pixels in the display panel, thereby improving the display effect of the display panel. However, in the current display device, the length of the connection circuit board between the source driver integrated circuit and the timing controller varies in different application scenario, it is necessary to write different programs to the timing controller in different application scenarios, which greatly reduces the applicability of the display device.

In the display device according to some embodiments of the present disclosure, the length of the connection circuit board is acquired by the test lines, so that the display device is simply and quickly applied to various application scenarios, which enhances the applicability of the display device.

Figure 8:
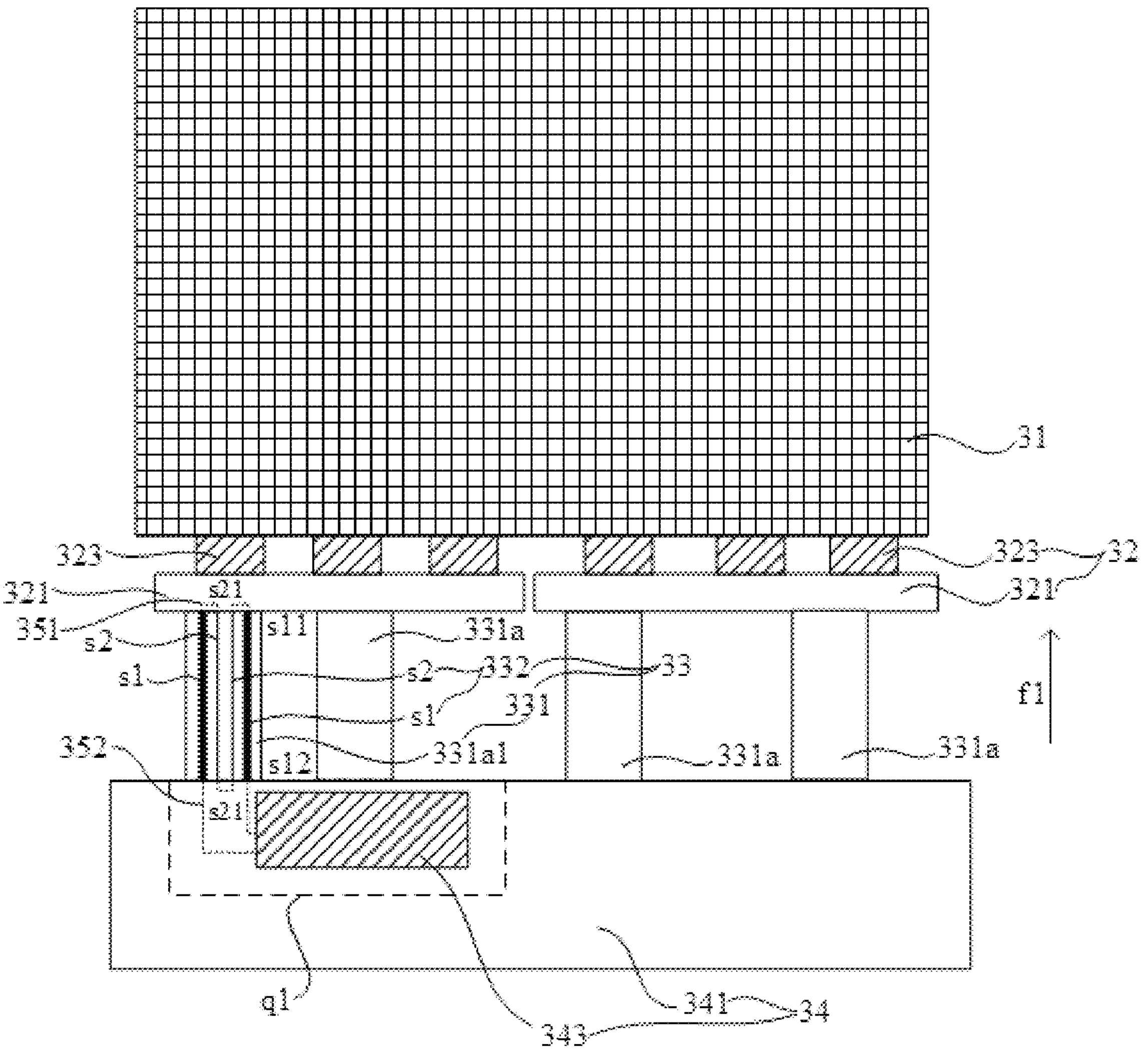
FIG. 8 is a schematic structural diagram of another display device according to some embodiments of the present disclosure.

FIG. 8 is a schematic structural diagram of another display device according to some embodiments of the present disclosure. Similar to the display device shown in FIG. 4, the test circuit 332 includes an even number of second test lines s2 extending in the first direction f1, first ends s21 of the second test lines s2 are disposed on a side of the connection circuit board 33 proximate to the first control assembly 32, second ends s22 of the second test lines s2 are disposed on a side of the connection circuit board 33 proximate to the second control assembly 34, and the even number of the second test lines s2 are connected in series with the first ends s11 of the two first test lines s1.

In addition, the board body 331 of the connection circuit board 33 includes multiple strip bodies 331*a*, the length direction of the strip bodies 331*a* is parallel to the first direction f1. Each strip body 331*a* may include a body and some lines disposed on the body.

In some embodiments, the first test lines s1 and the second test lines s2 are both disposed on a first strip body 331*a*1. The first strip body 331*a*1 is any one of multiple strip bodies 331*a*, or the first strip body 331*a*1 is a preset strip body. Exemplarily, the strip body 331*a* with the highest number of redundant connection terminals is determined as the first strip body 331*a*1.

Alternatively, the first control assembly 32 includes two first circuit boards 321 (FIG. 5 illustrates such a case), and one strip body 331*a* connected to the first circuit board 321 with more redundant ports in the two first circuit boards 321 is selected as the first strip body 331*a*1, so as to balance the lines connected to the two first circuit boards 321.

FIG. 8 illustrates a scheme for realizing the connection between the first test lines and the second test lines through the structure on the first control assembly 32 and the second control assembly 34, and the display device shown in FIG. 8 may also be structured to realize the connection between the first test lines and the second test lines in any one of the various ways provided by the embodiments described above, which is not limited by the embodiments of the present disclosure.

In some embodiments, the second circuit board 341 includes an edge region q1 connected to the connection circuit board 33, and the second controller 343 is disposed in the edge region q1, which shortens the length of the line connecting the second controller 343 to the first test lines s1 in the connection circuit board 33, thereby reducing the impact of this line in determining the length of the connection circuit board.

Figure 9:
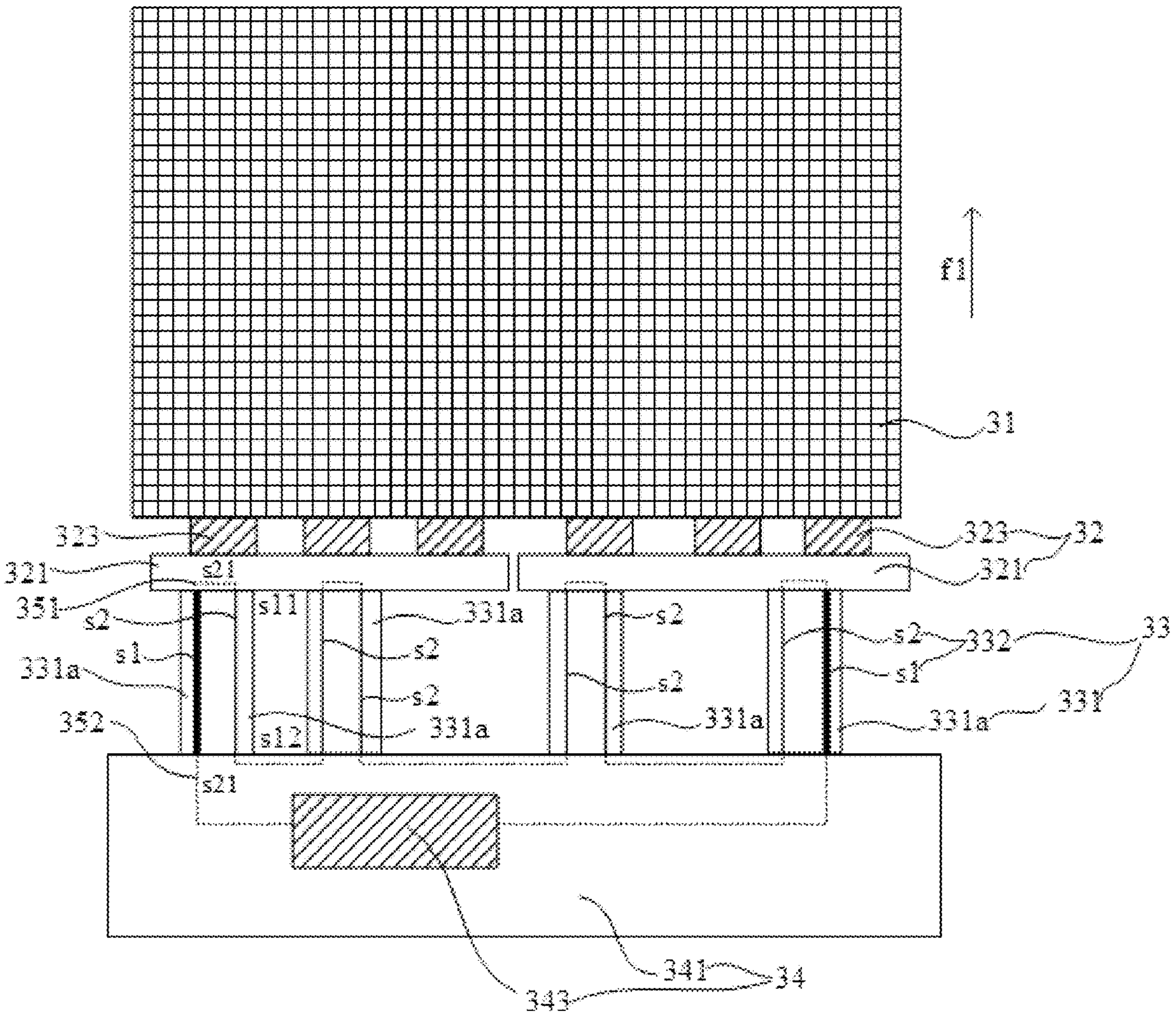
FIG. 9 is a schematic structural diagram of another display device according to some embodiments of the present disclosure.

FIG. 9 is a schematic structural diagram of another display device according to some embodiments of the present disclosure. Similar to the display device shown in FIG. 4, the test circuit 332 includes an even number of second test lines s2 extending in the first direction f1, first ends s21 of the second test lines s2 is disposed on a side of the connection circuit board 33 proximate to the first control assembly 32, second ends s22 of the second test lines s2 is disposed on a side of the connection circuit board 33 proximate to the second control assembly 34, and the even number of second test lines s2 are connected in series with the first ends s11 of the two first test lines s1.

In addition, the connection circuit board 33 includes multiple strip bodies 331*a*, the length direction of the strip bodies 331*a* is parallel to the first direction f1.

In some embodiments, the test lines in the test circuit 332 are disposed on at least two of the strip bodies 331*a*, and the test lines in the test circuit 332 include first test lines s1 and second test lines s2. In the embodiments, multiple test lines (s1 and s2) are disposed in multiple strip bodies 331*a*, which allows the number of test lines on one strip body 331*a* not to be excessive, and thus reduces the influence of multiple test lines on strip body 331*a*. These multiple test lines can be disposed on multiple strip bodies 331*a* in various ways. For example, multiple test lines are divided into n groups based on the number n of strip bodies 331*a*, and each group of test lines is disposed on a corresponding strip body 331*a*. That is, multiple test lines are uniformly disposed on each strip body 331*a*. In this way, the number of test lines on each strip body 331*a* is not excessive, as shown in FIG. 6. Alternatively, the test lines may be provided based on the number of redundant connection terminals on each strip body 331*a*, where the number of redundant connection terminals on the strip body 331*a* is positively correlated with the number of test lines, i.e., more test lines are provided on the strip body 331*a* with a large number of redundant connection terminals, and fewer or no test line is provided on the strip body 331*a* with a small number of redundant connection terminals.

FIG. 9 illustrates a scheme for realizing the connection between the first test lines and the second test lines through the structure on the first control assembly 32 and the second control assembly 34, and the display device shown in FIG. 9 may also be structured to realize the connection between the first test lines and the second test lines in any one of the various ways provided by the embodiments described above, which is not limited by the embodiments of the present disclosure.

Figure 10:
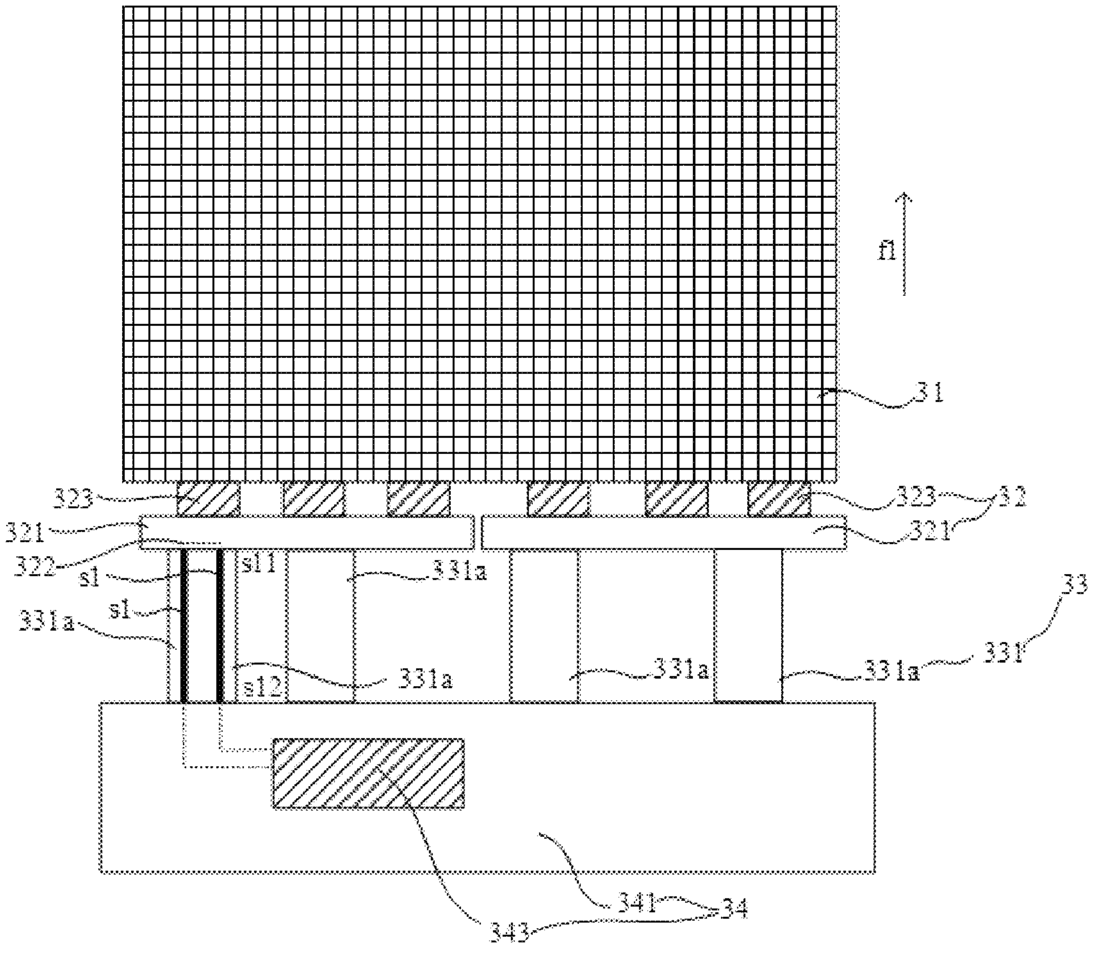
FIG. 10 is a schematic structural diagram of another display device according to some embodiments of the present disclosure.

FIG. 10 is a schematic structural diagram of another display device according to some embodiments of the present disclosure. The board body 331 of the connection circuit board 33 includes multiple strip bodies 331*a*, the length direction of the strip bodies 331*a* is parallel to the first direction f1. The first control assembly 32 includes a first circuit board 321, a fifth connection structure 322, and multiple first controllers 323. The fifth connection structure 322 is disposed on the first circuit board 321, and multiple first controllers 323 is electrically connected to the first circuit board 321. The fifth connection structure 322 is connected to first ends s11 of the two first test lines s1.

In addition, the display device provided in the embodiments of the present disclosure may be applied at least one method for controlling the display device provided in the subsequent embodiments.

In summary, according to the display device provided by the embodiments of the present disclosure, a test circuit is provided in the display device, and the test circuit includes two first test lines extending in a first direction, the two ends of the first test line are disposed on the connection circuit board proximate to the first control assembly and proximate to the second control assembly, respectively, and the two first test lines are electrically connected to the second control assembly, so that the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board. In this way, the display device is suitable for the connection circuit boards of various lengths, which solves the problem of the poor applicability of the display device in the related art, thereby improving the applicability of the display device.

Figure 11:
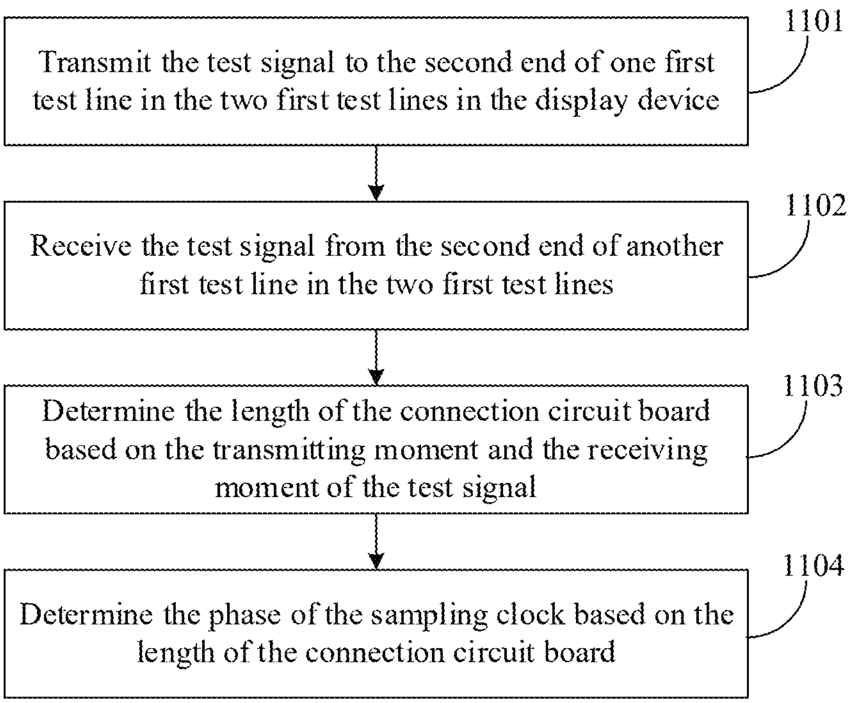
FIG. 11 is a flowchart of a method for controlling a display device according to some embodiments of the present disclosure.

FIG. 11 is a flowchart of a method for controlling a display device according to some embodiments of the present disclosure. The method is applicable to the second control assembly in the above-described display device and includes the following steps.

In step 1101, the test signal is transmitted to the second end of one first test line in the two first test lines in the display device.

In step 1102, the test signal is received from the second end of another first test line in the two first test lines.

In step 1103, the length of the connection circuit board is determined based on the transmitting moment and the receiving moment of the test signal.

In step 1104, the phase of the sampling clock is determined based on the length of the connection circuit board.

In summary, according to the method for controlling the display device provided by the embodiments of the present disclosure, the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board. In this way, the display device is suitable for the connection circuit boards of various lengths, which solves the problem of the poor applicability of the display device in the related art, thereby improving the applicability of the display device.

Figure 12:
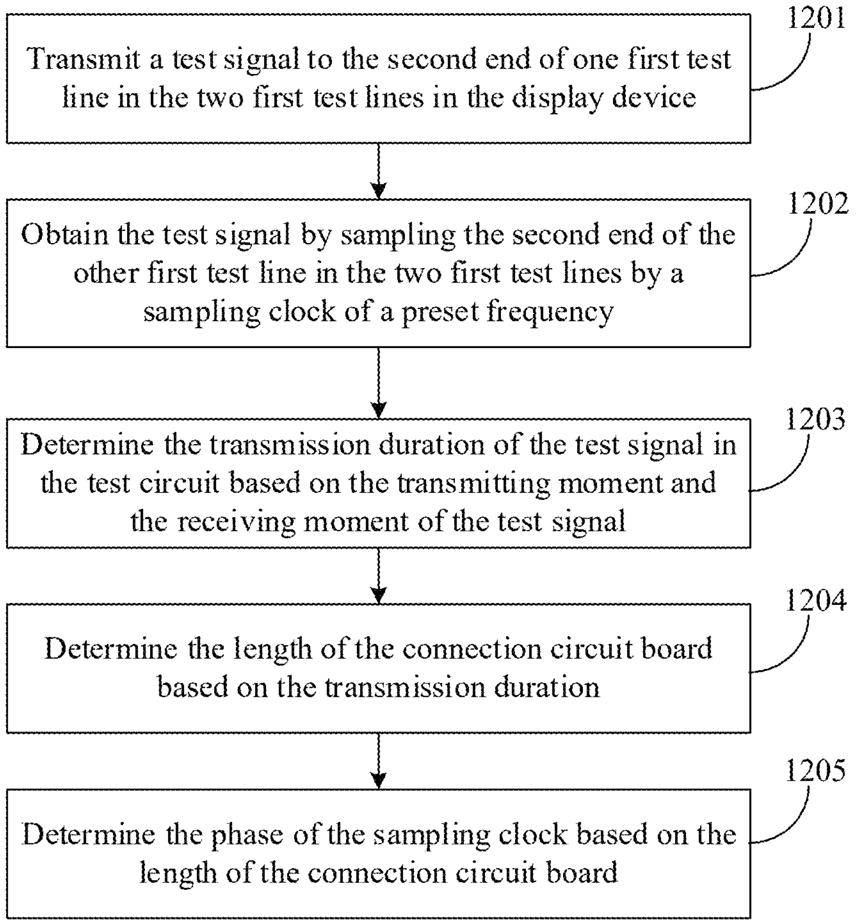
FIG. 12 is a flowchart of another method for controlling a display device according to some embodiments of the present disclosure.

FIG. 12 is a flowchart of a method for controlling a display device according to some embodiments of the present disclosure. The method is applicable to the second control assembly in the above-described display device and includes the following steps.

In step 1201, a test signal is transmitted to the second end of one first test line in the two first test lines in the display device.

In the method provided in embodiments of the present disclosure, the second control assembly transmits the test signal to the second end of one of the two first test lines. Taking the display device shown in FIG. 8 as an example, the second control assembly 34 transmits the test signal to one of the first test lines s1.

In step 1202, the test signal is acquired by sampling the second end of the other first test line in the two first test lines by a sampling clock of a preset frequency.

The second control assembly samples the second end of the other first test line in the two first test lines to acquire the test signal by means of a sampling clock of a preset frequency. The sampling clock is determined based on the transmission speed of the test signal in the test circuit (the test circuit includes the first test lines and the second test lines) and the number of times that the loop formed by the test lines is wrapped around the connection circuit board. Since the length of the loop formed by the test lines is unknown, the frequency required to acquire the test signal from the connection circuit board is determined as the preset frequency of the sampling clock in the shortest case (when the first control assembly and the second control assembly are connected by the connection circuit board of the shortest length).

Furthermore, as can be seen from the above embodiments, in the display device provided by the embodiments of the present disclosure, the length of the circuit formed by the test circuit is increased by increasing the number of times that the test circuit is wrapped around the connection circuit board, which in turn prolongs the transmission duration that the test signal is transmitted in the test circuit, and reduces the preset frequency of the sampling clock, such that the second control assembly acquires the test signal by a lower frequency.

In step 1203, the transmission duration of the test signal in the test circuit is determined based on the transmitting moment and the receiving moment of the test signal.

After acquiring the test signal from the first test line, the second control assembly determines the transmission duration of the test signal in the test circuit based on the transmitting moment and the receiving moment of the test signal.

Figure 13:
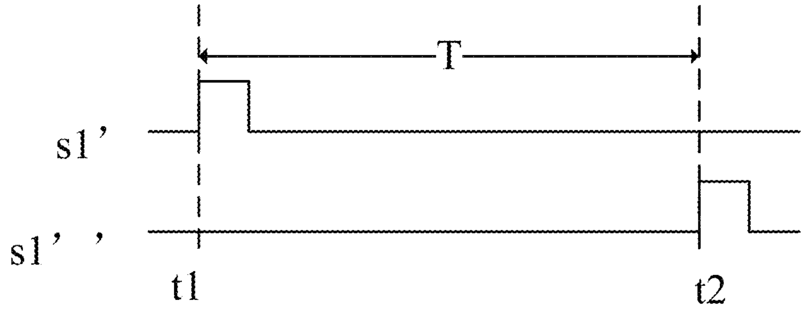
FIG. 13 is a schematic diagram of moments of transmitting and receiving a test signal according to some embodiments of the present disclosure.

FIG. 13 is a schematic diagram of moments of transmitting and receiving a test signal according to some embodiments of the present disclosure, the time between a transmitting moment t1 of the test signal sent by a first test line s1', and a receiving moment t2 of the test signal received by another first test line s1" is the transmission duration T of the test signal in the test line.

In step 1204, the length of the connection circuit board is determined based on the transmission duration.

The second control assembly determines the length of the connection circuit board based on the transmission duration determined in the above steps.

In embodiments of the present disclosure, the length of the connection circuit board is determined in various ways. The length of the connection circuit board is the length of the connection circuit board 33 in the first direction f1 as shown in FIG. 8.

FIRST OPTION: Such an option may determine the length of the connection circuit board based on a transmission duration and a transmission speed of the test signal in the test circuit. Specifically, step 1204 may include following sub-steps.

1) Acquire a duration difference between the transmission duration and a reference duration.

The second control assembly acquires the duration difference between the transmission duration and the reference duration. The reference duration is a transmission duration of the test signal in the reference connection circuit board of the reference length, which is acquired in advance by test. The structure, the connection method, and the number of the first test lines and the second test lines on the reference connection circuit board may be the same as those of the connection circuit board in the display device provided in the embodiment of the present disclosure. And the reference duration is acquired by testing when the reference connection circuit board is set in the display device provided in the embodiments of the present disclosure.

2) Determine a length difference based on the duration difference and the transmission speed of the test signal in the test circuit.

The second control assembly determines the length difference based on the duration difference and the transmission speed of the test signal in the test circuit. Exemplarily, the duration difference is Δt, and the transmission speed of the test signal in the test circuit is v, then the length difference is the product of the duration difference and the transmission speed divided by n, and n is the number of times that the test circuit has been wrapped around the connection circuit board (the number may be equal to the sum of the number of the first test lines and the number of the second test lines, which is 6 in the display panel shown in FIG. 8), i.e., $\Delta t*v/n$. The length difference is a difference between the length of the connection circuit board in the display device provided in the embodiment of the present disclosure and the length of the reference connection circuit board.

3) Determine the length of the connection circuit board based on the length difference and a reference length.

The second control assembly determines the sum of the length difference and the reference length as the length of the connection circuit board.

In the display device shown in FIG. 8, some connection lines (which may include some connection structures in the above embodiment, such as first connection structures, second connection structures, and the like) disposed in the first control assembly 32 and the second control assembly 34 for connecting the first test lines s1 and the second test lines s2 have a certain effect on the total length of the lines for transmitting the test signals. In this way, the length of the connection lines can be subtracted by determining the length difference, thereby avoiding the influence caused by the connection lines on the calculation of the length of the connection circuit board.

Second Option

1) Search for whether a reference length corresponding to the transmission duration is present in a preset lookup table based on the transmission duration.

The second control assembly searches for whether the reference length corresponding to the transmission duration is present in the preset lookup table based on the transmission duration. The preset lookup table records multiple reference transmission durations and reference lengths of the connection circuit board corresponding to multiple reference transmission durations. The preset lookup table may be obtained by pre-testing, for example, the transmission durations corresponding to connection circuit boards of various lengths can be tested.

(2) In response to the reference length corresponding to the transmission duration in the preset lookup table being present, the reference length is determined as the length of the connection circuit board.

When the reference length corresponding to the transmission duration is present in the preset lookup table, the second control assembly determines the reference length as the length of the connection circuit board. It should be noted that each reference duration in the preset lookup table may correspond to a reference duration range, and when the transmission duration is disposed in the reference duration range, the second control assembly determines the reference length corresponding to the reference duration range as the length of the connection circuit board. This approach also avoids some connection lines disposed in the first control assembly and the second control assembly for connecting the first test lines and the second test lines to affect the calculation of the length of the connection circuit board.

In step 1205, the phase of the sampling clock is determined based on the length of the connection circuit board.

The second control assembly determines the phase of the sampling clock based on the length of the connection circuit board in a variety of ways. For example, it may pre-test to obtain the phases of the sampling clock corresponding to the connection circuit boards of various lengths to achieve the required sampling effect, and select the phase of the sampling clock based on the length of the connection circuit board. Alternatively, a time delay for signal transmission may be calculated based on the length of the connection circuit board and the transmission speed of the signal in the connection circuit board, and the phase of the sampling clock may be determined based on the time delay. The second control assembly samples the signal acquired in the display panel based on the phase, so as to compensate the sub-pixels in the display panel and improve the display effect of the display device.

In summary, according to the method for controlling the display device provided by the embodiments of the present disclosure, the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board. In this way, the display device is suitable for the connection circuit boards of various lengths, which solves the problem of the poor applicability of the display device in the related art, thereby improving the applicability of the display device.

Figure 14:
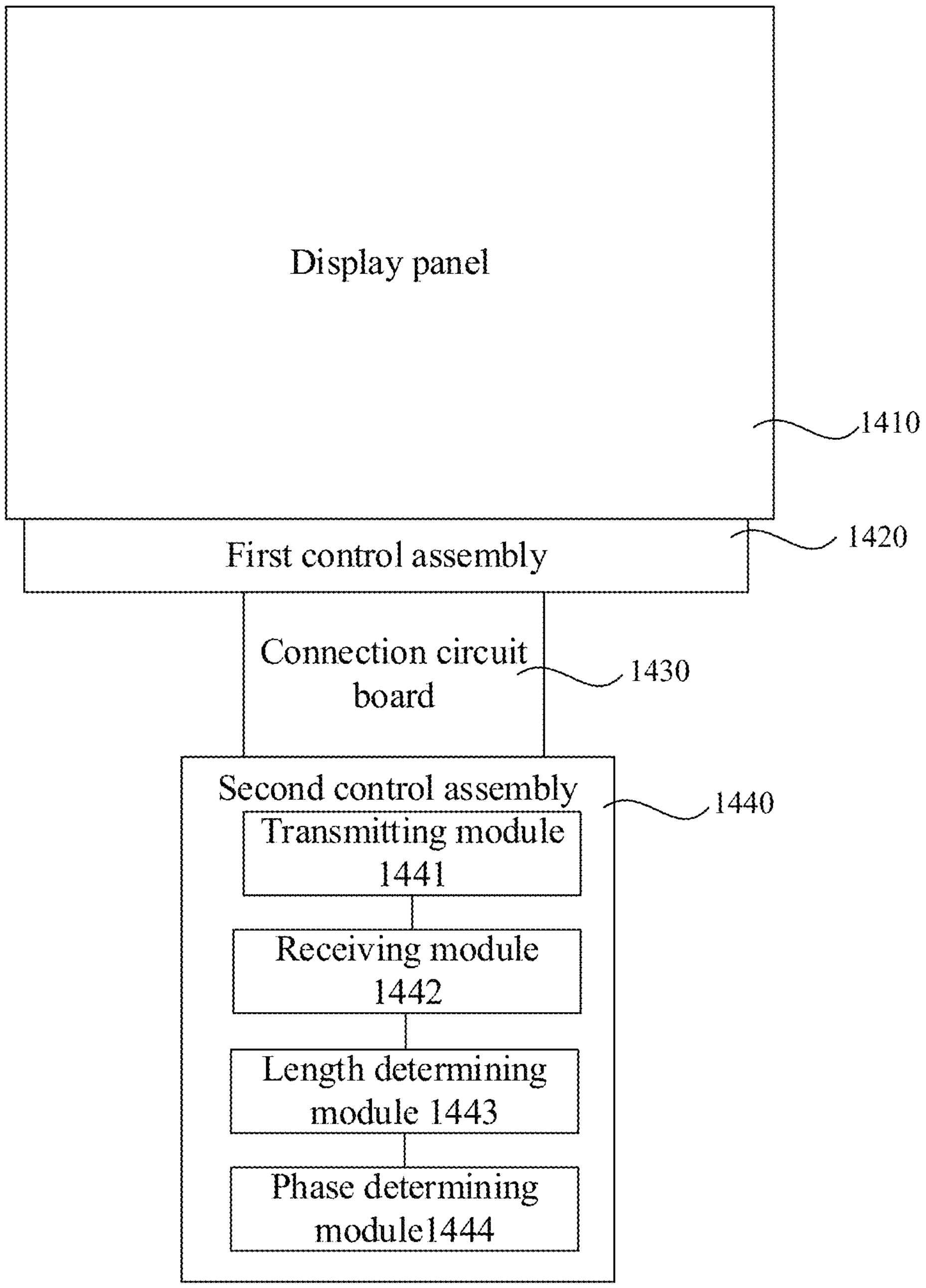
FIG. 14 is a block diagram of a display device according to some embodiments of the present disclosure.

FIG. 14 is a block diagram of a display device according to some embodiments of the present disclosure, the display device includes: a display panel 1410, a first control assembly 1420, a connection circuit board 1430, and a second control assembly 1440.

The display panel 1410 is connected to the first control assembly 1420, one end of the connection circuit board 1430 is connected to the first control assembly 1420, and the other end of the connection circuit board 1430 is connected to the second control assembly 1440.

The connection circuit board 1430 includes a board body, a test circuit disposed on the board body, and a signal transmission line. The test circuit includes two first test lines extending in a first direction, first ends of the two first test lines are electrically connected and are disposed on a side of the connection circuit board proximate to the first control assembly, second ends of the two first test lines are disposed on a side of the second control assembly proximate to the second control assembly and are electrically connected to the second control assembly. The first direction is parallel to the signal transmission line, and the signal transmission line is configured to transmit signals between the first control assembly and the second control assembly. For example, the signal transmission line h1 is configured to transmit various signals such as return signals, display control signals, and display data signals.

The second control assembly 1440 includes:

A transmitting module 1441, configured to transmit a test signal to a second end of one first test line in the two first test lines in the display device.

A receiving module 1442, configured to receive the test signal from a second end of another first test line in the two first test lines.

A length determining module 1443, configured to determine a length of the connection circuit board based on a transmitting moment and a receiving moment of the test signal.

A phase determining module 1444, configured to determine a phase of a sampling clock based on the length of the connection circuit board.

In summary, according to the display device provided by the embodiments of the present disclosure, a test circuit is provided in the display device, and the test circuit includes two first test lines extending in a first direction, the two ends of the first test line are disposed on the connection circuit board proximate to the first control assembly and proximate to the second control assembly, respectively, and the two first test lines are electrically connected to the second control assembly, so that the second control assembly transmits a test signal to one test line and receives the test signal from the other test line, determines the length of the connection circuit board based on the transmitting moment and the receiving moment of the test signal, and further determines the phase of the sampling clock based on the length of the connection circuit board. In this way, the display device is suitable for the connection circuit boards of various lengths, which solves the problem of the poor applicability of the display device in the related art, thereby improving the applicability of the display device.

According to some embodiments of the present application, a display device is provided. The display device includes a processor and a memory. The memory stores at least one instruction, at least one program segment, a code set, or an instruction set therein. The processor, when loading and executing the at least one instruction, the at least one program segment, the code set, or the instruction set, is caused to perform the method for controlling the display device as described above.

According to some embodiments of the present application, a non-transitory computer storage medium is provided. The computer storage medium has stored therein at least one instruction, at least one program segment, a code set, or an instruction set. The at least one instruction, the at least one program segment, the code set, or the instruction set, when loaded and executed by a processor, causes the process to perform the method for controlling the display device as described above.

According to some embodiments of the present application, a computer program product or computer program is provided. The computer program product or computer program includes computer instructions that are stored in a computer-readable storage medium. The computer instructions, when read and executed by a processor of a computer device, cause the computer device to perform the method for controlling the display device as described above.

The term "at least one of A and B" in the present application is merely a description of an association relationship of an associated object, and indicates that three relationships exist, for example, at least one of A and B is indicated as: the existence of A alone, the existence of both A and B, and the existence of B alone. Similarly, "at least one of A, B, and C" indicates that seven relationships exist, which are expressed as follows: A alone, B alone, C alone, both A and B, both A and C, both C and B, and both A, B, and C in seven cases. Similarly, "at least one of A, B, C and D" means that fifteen relationships exist, which are expressed as: A alone, B alone, C alone, D alone, both A and B, both A and C, both A and D, both C and B, both D and B, both C and D, both A and B, both A and B, both A and B, both D and C, both C and D, and both A, B and C. A, B and C at the same time, A, B and D at the same time, A, C and D at the same time, B, C and D at the same time, A, B, C and D at the same time, these are the fifteen cases.

It should be noted that in the accompanying drawings, the dimensions of the layers and regions may be exaggerated for the sake of clarity of illustration. Moreover, it is understood that when an element or layer is referred to as being "on" another element or layer, it may be directly on the other element or there may be intermediate layers. Also, it can be understood that when the element or layer is referred to as being "under" another element or layer, it can be directly under the other element, or more than one intermediate layer or element can exist. It is also understood that when a layer or element is referred to as being "between" two layers or elements, it may be the only layer between the two layers or elements, or more than one intermediate layer or element may also exist. Similar reference marks throughout indicate similar elements.

In this application, the terms “first,” “second,” “third,” “fourth,” and “fifth” are used for descriptive purposes only and are not to be construed as indicating or implying relative importance. The term “plural” refers to two or more, unless otherwise expressly limited.

In the several embodiments provided in the present application, it should be understood that the apparatuses and methods disclosed can be realized in other ways. For example, the apparatuses embodiments described above are merely schematic, e.g., the division of the units described, is merely a logical functional division, and the actual implementation is divided in other ways, e.g., multiple units or components are combined or are integrated into another system, or some features are ignored, or not implemented. Another point is that the mutual coupling or direct coupling or communication connection shown or discussed is an indirect coupling or communication connection through some interface, device or unit, which is electrical, mechanical or otherwise.

The units illustrated as separated components is or is not physically separated, and components displayed as units are or are not physical units, i.e., they are disposed in one place, or they are distributed to multiple network units. Some or all of these units are selected to fulfill the purpose of this embodiment scheme according to actual needs.

A person of ordinary skill in the art may understand that all or some of the steps for realizing the above embodiments are accomplished by hardware, or accomplished by a program that instructs the relevant hardware to do so, and the program is stored in a computer-readable storage medium, and that the storage medium referred to above is a read-only memory, a disk or a CD-ROM, or the like.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

The invention claimed is:

1. A display device, comprising: a display panel, a first control assembly, a connection circuit board, and a second control assembly, wherein the display panel is connected to the first control assembly, one end of the connection circuit board is connected to the first control assembly, and another end of the connection circuit board is connected to the second control assembly;

the connection circuit board comprises a board body, a test circuit and a signal transmission line that are disposed on the board body, wherein the test circuit comprises two first test lines extending in a first direction, first ends of the two first test lines are electrically connected and are disposed on a side of the connection circuit board proximate to the first control assembly, second ends of the two first test lines are disposed on a side of the connection circuit board proximate to the second control assembly and are connected to the second control assembly, the first direction being parallel to the signal transmission line; and the signal transmission line is configured to transmit signals between the first control assembly and the second control assembly; and the second control assembly is configured to: transmit a test signal to a second end of one first test line in the two first test lines and receive the test signal from a second end of another first test line in the two first test lines, determine a length of the connection circuit board in the first direction based on a transmitting moment and a receiving moment of the test signal, and determine a phase of a sampling clock based on the length of the connection circuit board in the first direction;

wherein the test circuit further comprises an even number of second test lines extending in the first direction, wherein first ends of the second test lines are disposed on the side of the connection circuit board proximate to the first control assembly, and second ends of the second test lines are disposed on the side of the connection circuit board proximate to the second control assembly, the even number of second test lines being connected in series, and further being connected in series with the first ends of the two first test lines.

2. The display device according to claim 1, wherein the board body comprises a plurality of strip bodies, a length direction of each of the strip bodies being parallel to the first direction.

3. The display device according to claim 2, wherein test lines in the test circuit are disposed on at least two of the plurality of strip bodies, the test lines in the test circuit comprising the first test lines and the second test lines.

4. The display device according to claim 2, wherein the first test lines and the second test lines are disposed on a first strip body in the plurality of strip bodies.

5. The display device according to claim 1, further comprising first connection structures disposed in the first control assembly and in the second control assembly, wherein the first connection structures are connected to the even number of second test lines and further connect the even number of second test lines in series with the first ends of the two first test lines.

6. The display device according to claim 1, wherein the connection circuit board further comprises second connection structures disposed on the board body, the second connection structure being connected to the even number of second test lines and connecting the even number of second test lines in series with the first ends of the two first test lines.

7. The display device according to claim 1, further comprising third connection structures and fourth connection structures, wherein the third connection structures are disposed on the connection circuit board, and the fourth connection structures are disposed in the first control assembly or the second control assembly;

in a case that the fourth connection structures are disposed in the first control assembly, the third connection structures are connected to the second ends of the even number of second test lines, and the fourth connection structures are connected to the first ends of the even number of second test lines and connect the even number of second test lines in series with the first ends of the two first test lines;

in a case that the fourth connection structures are disposed in the second control assembly, the fourth connection structures are connected to the second ends of the even number of second test lines, and the third connection structures are connected to the first ends of the even number of second test lines and connect the even number of second test lines in series with the first ends of the two first test lines.

8. The display device according to claim 1, wherein the first control assembly comprises a first circuit board, a fifth connection structure, and a plurality of first controllers, the fifth connection structure being disposed on the first circuit board and the plurality of first controllers being electrically connected to the first circuit board; wherein the fifth connection structure is connected to the first ends of the two first test lines.

9. The display device according to claim 1, wherein the second control assembly comprises a second circuit board, and connection lines and a second controller disposed on the second circuit board, the second controller being electrically connected to the second ends of the two first test lines via the connection lines; wherein the connection lines are further connected to the first ends of the two first test lines.

10. The display device according to claim 9, wherein the second circuit board is provided with an edge region connected to the connection circuit board, the second controller being disposed in the edge region.

11. The display device according to claim 1, wherein the first control assembly is a source driver control assembly and the second control assembly is a timing control assembly; wherein the connection circuit board comprises a flexible circuit board.

12. A method for controlling a display device, applicable to the second control assembly in the display device as defined in claim 1, the method comprising:

transmitting the test signal to the second end of one first test line in the two first test lines in the display device;

receiving the test signal from the second end of another first test line in the two first test lines;

determining the length of the connection circuit board in the first direction based on the transmitting moment and the receiving moment of the test signal; and determining the phase of the sampling clock based on the length of the connection circuit board in the first direction.

13. The method according to claim 12, wherein determining the length of the connection circuit board in the first direction based on the transmitting moment and the receiving moment of the test signal comprises:

determining a transmission duration of the test signal in the test circuit based on the transmitting moment and the receiving moment of the test signal; and determining the length of the connection circuit board in the first direction based on the transmission duration and a transmission speed of the test signal in the test circuit.

14. The method according to claim 13, wherein determining the length of the connection circuit board in the first direction based on the transmission duration and the transmission speed of the test signal in the test circuit comprises:

acquiring a duration difference between the transmission duration and a reference duration;

determining a length difference based on the duration difference and a transmission speed of the test signal in the test circuit; and determining the length of the connection circuit board in the first direction based on the length difference and a reference length;

wherein the reference duration is a transmission duration of the test signal in a reference connection circuit board of the reference length.

15. The method according to claim 12, wherein determining the length of the connection circuit board in the first direction based on the transmitting moment and the receiving moment of the test signal comprises:

determining a transmission duration of the test signal in the test circuit based on the transmitting moment and the receiving moment of the test signal;

searching for whether a reference length corresponding to the transmission duration is present in a preset lookup table based on the transmission duration, wherein the preset lookup table records a plurality of reference transmission durations and reference lengths, corresponding to the plurality of reference transmission lengths, of the connection circuit board;

in response to the reference length corresponding to the transmission duration being present in the preset lookup table, determining the reference length as the length of the connection circuit board in the first direction.

16. The method according to claim 12, wherein receiving the test signal from the second end of another first test line in the two first test lines comprises:

acquiring the test signal by sampling the second end of another first test line in the two first test lines by a sampling clock of a preset frequency.

17. A display device comprising a processor and a memory storing at least one instruction, at least one program segment, a code set, or an instruction set therein, wherein the processor, when loading and executing the at least one instruction, the at least one program segment, the code set, or the instruction set, is caused to perform the method for controlling the display device as defined in claim 14.

18. A non-transitory computer storage medium storing at least one instruction, at least one program segment, a code set, or an instruction set therein, wherein the at least one instruction, the at least one program segment, the code set, or the instruction set, when loaded and executed by a processor, causes the process to perform the method for controlling the display device as defined in claim 14.

* * * * *